(12) United States Patent
Tsirline et al.

(10) Patent No.: US 7,650,114 B2
(45) Date of Patent: *Jan. 19, 2010

(54) SPATIALLY SELECTIVE UHF NEAR FIELD MICROSTRIP COUPLER DEVICE AND RFID SYSTEMS USING DEVICE

(75) Inventors: Boris Y. Tsirline, Glenview, IL (US); Clive P. Hohberger, Highland Park, IL (US); Robert Gawelczyk, Chicago, IL (US); Daniel F. Donato, Johnsburg, IL (US)

(73) Assignee: ZIH Corp., Hamilton Parish (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/133,801

(22) Filed: Jun. 5, 2008

(65) Prior Publication Data

US 2009/0008448 A1 Jan. 8, 2009

Related U.S. Application Data

(62) Division of application No. 10/604,996, filed on Aug. 29, 2003, now Pat. No. 7,398,054.

(51) Int. Cl.
H04B 7/00 (2006.01)
(52) U.S. Cl. ............... 455/41.2; 455/41.1; 455/151; 455/330; 340/572.1; 340/10.1; 235/451; 343/749
(58) Field of Classification Search ............... 455/41.1, 455/41.2, 151, 330; 340/10.1, 572.1, 10.5, 340/505; 343/749
See application file for complete search history.

(56) References Cited

U.S. PATENT DOCUMENTS

| 3,742,319 A | * | 6/1973 | Bryan et al. | ............ 257/581 |
| 4,371,876 A | * | 2/1983 | Nash | ............ 343/768 |
| 4,509,039 A | | 4/1985 | Dowdle | |
| 5,006,812 A | * | 4/1991 | Erickson | ............ 330/2 |
| 5,278,571 A | | 1/1994 | Helfrick | |

(Continued)

FOREIGN PATENT DOCUMENTS

DE 93 21 478 U 8/1998

(Continued)

OTHER PUBLICATIONS

International Search Report for PCT/US2004/027832, dated Dec. 30, 2004.

(Continued)

*Primary Examiner*—Minh D Dao
(74) *Attorney, Agent, or Firm*—Alston & Bird LLP (57) ABSTRACT

A system having a UHF RFID transceiver is adapted to communicate exclusively with a single electro-magnetically coupled transponder located in a predetermined confined transponder operating region. The system includes a near field coupling device comprising a plurality of lines connected in parallel with an unmatched load. The near field coupling device may be formed, for example on a printed circuit board with a plurality of electrically interconnected traces and a ground plane. The system establishes, at predetermined transceiver power levels, a mutual electro-magnetic coupling which is selective exclusively for a single transponder located in a defined transponder operating region. Also included are methods for selective communication with the transponder in an apparatus such as a printer-encoder.

8 Claims, 5 Drawing Sheets

U.S. PATENT DOCUMENTS

| | | | |
|---|---|---|---|
| 5,369,381 A | 11/1994 | Gamand | |
| 5,373,266 A | 12/1994 | Lenzing et al. | |
| 5,608,417 A | 3/1997 | de Vall | |
| 5,777,586 A | 7/1998 | Luxon et al. | |
| 5,838,253 A | 11/1998 | Wurz et al. | |
| 6,067,475 A * | 5/2000 | Graves et al. | 607/101 |
| 6,104,291 A | 8/2000 | Beauvillier et al. | |
| 6,118,379 A * | 9/2000 | Kodukula et al. | 340/572.8 |
| 6,154,137 A * | 11/2000 | Goff et al. | 340/572.4 |
| 6,181,287 B1 * | 1/2001 | Beigel | 343/741 |
| 6,215,402 B1 * | 4/2001 | Rao Kodukula et al. | 340/572.8 |
| 6,246,326 B1 | 6/2001 | Wiklof et al. | |
| 6,267,521 B1 | 7/2001 | Lodwig et al. | |
| 6,392,544 B1 | 5/2002 | Collins et al. | |
| 6,409,401 B1 * | 6/2002 | Petteruti et al. | 400/88 |
| 6,424,262 B2 * | 7/2002 | Garber et al. | 340/572.3 |
| 6,466,131 B1 * | 10/2002 | Tuttle et al. | 340/572.7 |
| 6,470,082 B1 * | 10/2002 | Nunokawa et al. | 379/357.01 |
| 6,473,028 B1 | 10/2002 | Luc | |
| 6,527,356 B1 | 3/2003 | Spurr et al. | |
| 6,899,476 B1 * | 5/2005 | Barrus et al. | 400/76 |
| 6,929,412 B1 | 8/2005 | Barrus et al. | |
| 6,985,754 B1 * | 1/2006 | Pedersen et al. | 455/556.2 |
| 7,023,391 B2 * | 4/2006 | Wuidart et al. | 343/749 |
| 7,190,270 B2 * | 3/2007 | Brown et al. | 340/572.1 |
| 7,398,054 B2 * | 7/2008 | Tsirline et al. | 455/41.1 |
| 7,425,887 B2 * | 9/2008 | Tsirline et al. | 340/10.1 |
| 2001/0000430 A1 * | 4/2001 | Smith et al. | 340/572.1 |
| 2002/0167397 A1 | 11/2002 | Eroglu et al. | |
| 2003/0067504 A1 | 4/2003 | Spurr et al. | |
| 2003/0173408 A1 * | 9/2003 | Mosher et al. | 235/492 |
| 2003/0224805 A1 * | 12/2003 | Suenaga | 455/456.1 |
| 2004/0095242 A1 * | 5/2004 | Grose et al. | 340/572.1 |
| 2004/0178267 A1 | 9/2004 | Tsirline et al. | |
| 2004/0195319 A1 * | 10/2004 | Forster | 235/385 |
| 2004/0203605 A1 * | 10/2004 | Safa | 455/411 |
| 2005/0032267 A1 * | 2/2005 | Liu et al. | 438/57 |
| 2005/0045723 A1 * | 3/2005 | Tsirline et al. | 235/451 |
| 2005/0045724 A1 * | 3/2005 | Tsirline et al. | 235/451 |
| 2005/0274799 A1 * | 12/2005 | Torchalski et al. | 235/432 |
| 2006/0037502 A1 * | 2/2006 | Warther | 101/232 |
| 2007/0080867 A1 * | 4/2007 | Son et al. | 343/700 MS |
| 2007/0176781 A1 * | 8/2007 | Brown et al. | 340/572.1 |

FOREIGN PATENT DOCUMENTS

| | | |
|---|---|---|
| EP | 0 414 628 A | 2/1991 |
| EP | 0 568 066 A1 | 11/1993 |
| EP | 0 568 067 A1 | 11/1993 |
| EP | 0 704 815 A2 | 4/1996 |
| EP | 1 224 607 A | 7/2002 |
| EP | 1 233 367 A | 8/2002 |
| GB | 2 321 551 A | 7/1998 |
| JP | 2003132330 | 5/2003 |

OTHER PUBLICATIONS

International Search Report for PCT/US2004/027832, dated May 6, 2005 and Written Opinion.
K.C. Gupta, Microstrip Lines and Slotlines, 1996, Artech House Publishers, USA.
Maloratsky, The Basics of Print Reciprocal Dividers/Combiners, Microwave Journal, Sep. 2000, USA.
Maloratsky, Reviewing the Basics of Suspended Striplines, Microwave Journal, Oct. 2002, USA.
Maloratsky, Reviewing the Basics of Microstrip Lines, Microwaves & RF, pp. 79-88, Mar. 2000, USA.
Maloratsky, Improve BPF Performance with Wiggly Coupled Lines, Microwaves & RF, pp. 53-62, Apr. 2002, USA.
Maloratsky, Design Regular And Irregular Print Coupled Lines, Microwaves & RF, pp. 97-106, Sep. 2000, USA.
Maloratsky, Couplers Shrink HF/VHF/UHF Designs, Microwaves & RF, pp. 93-96, Jun. 2000, USA.
Maloratsky, Understand the Basics of Microstrip Directional Couplers, Microwaves & RF, pp. 79-94, Feb. 2001, USA.
McMillan et al., Leaky Fields on Microstrip, Progress in Electomagnetics Research, PIER 17, pp. 323-377, 1997 USA.
Office Action from U.S. Appl. No. 11/121,208 dated Aug. 18, 2009.

* cited by examiner

SPATIALLY SELECTIVE UHF NEAR FIELD MICROSTRIP COUPLER DEVICE AND RFID SYSTEMS USING DEVICE

CROSS-REFERENCE TO RELATED APPLICATIONS

This application is a divisional of U.S. application Ser. No. 10/604,996, filed Aug. 29, 2003, which is hereby incorporated herein in its entirety by reference.

BACKGROUND OF THE INVENTION

1. Field of the Invention

The invention relates to RFID systems, operable with a variety of different dimensioned electro-magnetically coupled transponders, working at close proximity, to an RF transceiver antenna that is spatially selective for an individual transponder located in a predetermined transponder operating region to the exclusion of other adjacent transponders, and its application to printers-encoders or other systems utilizing such in UHF RFID systems.

2. Description of Related Art

UHF radio frequency identification (RFID) technology allows wireless data acquisition and or transmission from and or to active (battery powered) or passive transponders using a backscatter technique. To communicate with, i.e., "read" from and or "write" commands and/or data to a transponder, the transponder is exposed to an RF electromagnetic field by the transceiver that couples with and energizes (if passive) the transponder through electromagnetic induction and transfers commands and data using a predefined "air interface" RF signaling protocol.

When multiple passive transponders are within the range of the same RF transceiver electromagnetic field they will each be energized and attempt to communicate with the transceiver, potentially causing errors in "reading" and or "writing" to a specific transponder in the reader field. Anti-collision management techniques exist to allow near simultaneous reading and writing to numerous closely grouped transponders in a common RF electromagnetic field. However, anti-collision management increases system complexity, cost and delay response. Furthermore, anti-collision management is "blind" in that it cannot recognize where a specific transponder being processed is physically located in the RF electromagnetic field, for example, which transponder is located proximate the print head of a printer-encoder.

One way to prevent errors during reading and writing to transponders without using anti-collision management is to electrically isolate a specific transponder of interest from nearby transponders. Previously, isolation of transponders has used RF-shielded housings and/or anechoic chambers through which the transponders are individually passed for personalized exposure to the interrogating RF field. This requires that the individual transponders have cumbersome shielding or a significant spatial separation.

RFID printers-encoders have been developed which are capable of on-demand printing on labels, tickets, tags, cards or other media with which a transponder is attached or embedded. These printer-encoders have a transceiver for on-demand communicating with the transponder on the individual media to read and/or store data into the attached transponder. For the reasons given, it is highly desirable in many applications to present the media on rolls or other format in which the transponders are closely spaced. However, close spacing of the transponders exacerbates the task of serially communicating with each individual transponder without concurrently communicating with neighboring transponders on the media. This selective communication exclusively with an individual transponder is further exacerbated in printers-encoders designed to print on the media in or near the same space as the transponder is positioned when being interrogated.

When transponders are supplied attached to a carrier substrate, for example in RFID-attached labels, tickets, tags or other media supplied in bulk rolls, Z-folded stacks or other format, an extra length of the carrier substrate is required to allow one transponder on the carrier substrate to exit the isolated field area before the next transponder in line enters it. The extra carrier substrate increases materials costs and the required volume of the transponder media bulk supply for a given number of transponders. Having increased spacing between transponders may also slow overall printer-encoder throughput.

When transponders of different sizes and form factors are processed, the RF shielding and or anechoic chamber configuration will also require reconfiguration, adding cost, complexity and reducing overall productivity. In certain printer-encoders it is desired to print on transponder-mounting media in the same transponder operating region in which the transponder is being read from or written to. This may be very difficult to accomplish if the transponder also must be isolated in a shielded housing or chamber.

Figure 1:
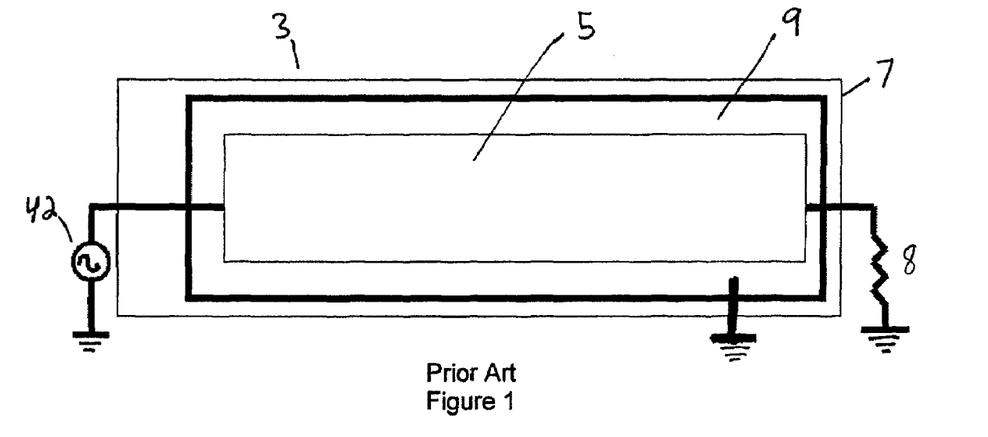
FIG. 1 is a top view of a prior art microstrip forward wave coupler.

UHF transponders may operate in, for example, the 902-928 MHz band in the United States and other ISM bands designated in different parts of the world. For example, in FIG. 1 a conventional one-half wavelength "Forward Wave" microstrip prior art coupler 3 consisting of a, for example, rectangular conductive strip 5 upon a printed circuit board 7 having a separate ground plane 9 layer configured for these frequencies. One end of the conductive strip 5 is connected to transceiver 42 and the other end is connected through terminating resistor 8 to ground plane 9. The conductive strip 5 as shown in FIG. 1 has a significant width due to RF design requirements imposed by the need to create acceptable frequency response characteristics. This type of prior art coupler 3 has been used with UHF transponders that are relatively large compared to the extent of prior art coupler 3.

Figure 2A:
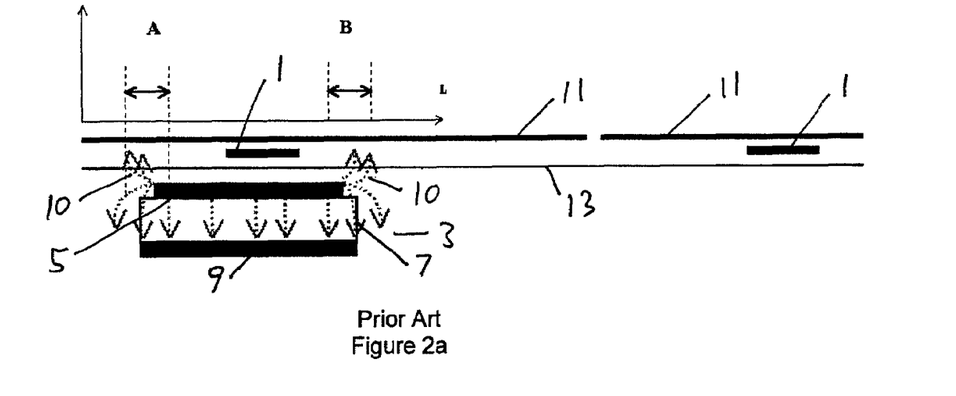
FIG. 2a is a simplified cut-away side view of a transponder-coupler structure using a prior art forward wave coupler as shown in FIG. 1, illustrating schematically locations where coupling with a narrow dimensioned transponder supplied in-line with other transponders on a carrier substrate may occur.
Figure 2B:
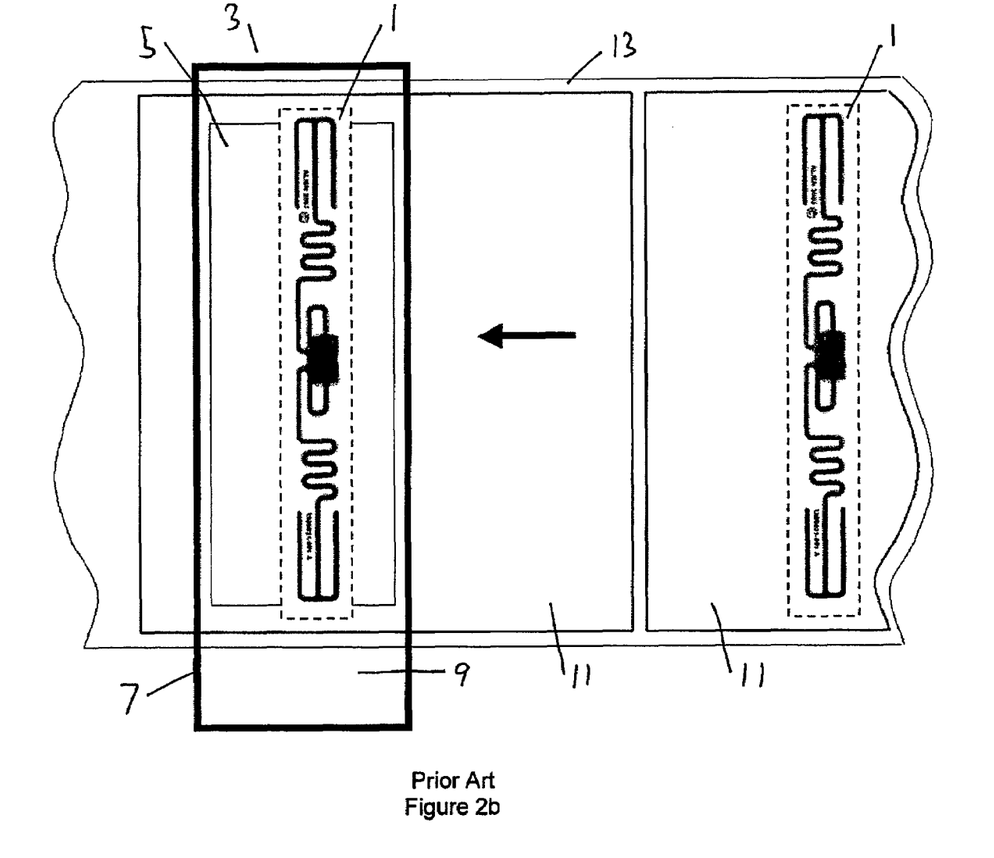

As shown by FIGS. 2a and 2b, recently developed transponders 1, designed for operation at UHF frequencies, have one dimension so significantly reduced, here for example a few millimeters wide, that they will be activated upon passage proximate the larger prior art coupler 3 by electro-magnetic power leakage 10 concentrated at either side edge of the conductive strip 5 of prior art coupler 3. In FIG. 2A, the two leakage regions "A" and "B" defined by electro-magnetic power leakage 10 are small and relatively far apart, increasing system logical overhead and media conveyance positioning accuracy requirements. If the transponders 1 were placed close together, then multiple transponders 1 might be activated by the physically extensive one-half wavelength "Forward Wave" microstrip prior art coupler 3.

Thus the minimum required spacing of these transponders 1 to isolate them, and thus the minimum size of media 11 (assuming that they are embedded one per label or media 11 on carrier substrate 13) must be large relative to the size of the microstrip coupler 3. This creates issues for media suppliers by limiting the available space on the media 11 for transponder 1 placement and significantly increasing the necessary accuracy of the transponder 1 placement within and or under the printable media 11 and along the liner or carrier substrate 13. This also reduces the cost advantages of using the narrow dimensioned transponder(s) 1 within media 11, as the media 11 must be much larger than the transponder 1 to achieve adequate RF isolation.

Competition in the market for such "integrated" printer-encoder systems as well as other RFID interrogation systems has focused attention on the ability to interrogate with high spatial selectivity any transponder from a wide range of available transponders having different sizes, shapes and coupling characteristics as well as minimization of overall system, media size, and transponder costs.

Therefore, it is an object of the invention to provide a device, systems, and methods that overcome deficiencies in such prior art.

BRIEF DESCRIPTION OF THE SEVERAL VIEWS OF THE DRAWING(S)

The accompanying drawings, which are incorporated in and constitute a part of this specification, illustrate embodiments of the invention and, together with a general description of the invention given above, and the detailed description of the embodiments given below, serve to explain the principles of the invention.

FIG. 2b is a partial cut-away top schematic view of the prior art forward wave coupler and carrier substrate with embedded transponders of FIG. 2a.

FIG. 5b is a partial cut-away top schematic view of the coupler according to the invention and carrier substrate with embedded transponders of FIG. 5a.

DETAILED DESCRIPTION OF THE INVENTION

The present invention concerns apparatus and method which enables an RFID transceiver (sometimes termed herein an "interrogator") to communicate selectively and exclusively with a single UHF transponder 1 when one or more other similar transponders are in close proximity, without the need for physical isolation or cumbersome shielded housings or chambers.

The invention is useful in the reading and or data loading of UHF transponders, for example on an assembly line, in distribution centers or warehouses where on-demand RFID labeling is required, and in a variety of other applications. In many applications a transponder or a number of transponders are mounted or embedded on or in a label, ticket, tag, card or other media carried on a liner or carrier. It is often desirable to be able to print on the media before, after, or during communication with a transponder. Although this invention is disclosed here in a specific embodiment for use with a direct thermal or thermal transfer printer, it may also be used with any type of spatially selective RFID interrogation device or other types of printers using other printing technologies, including inkjet, dot-matrix, and electro-photographic methods.

In some applications a print station may be at a distance from the RFID transceiver; in others it may be necessary to accomplish the print function in the same target space occupied by the transponder when it is being interrogated.

Figure 3:
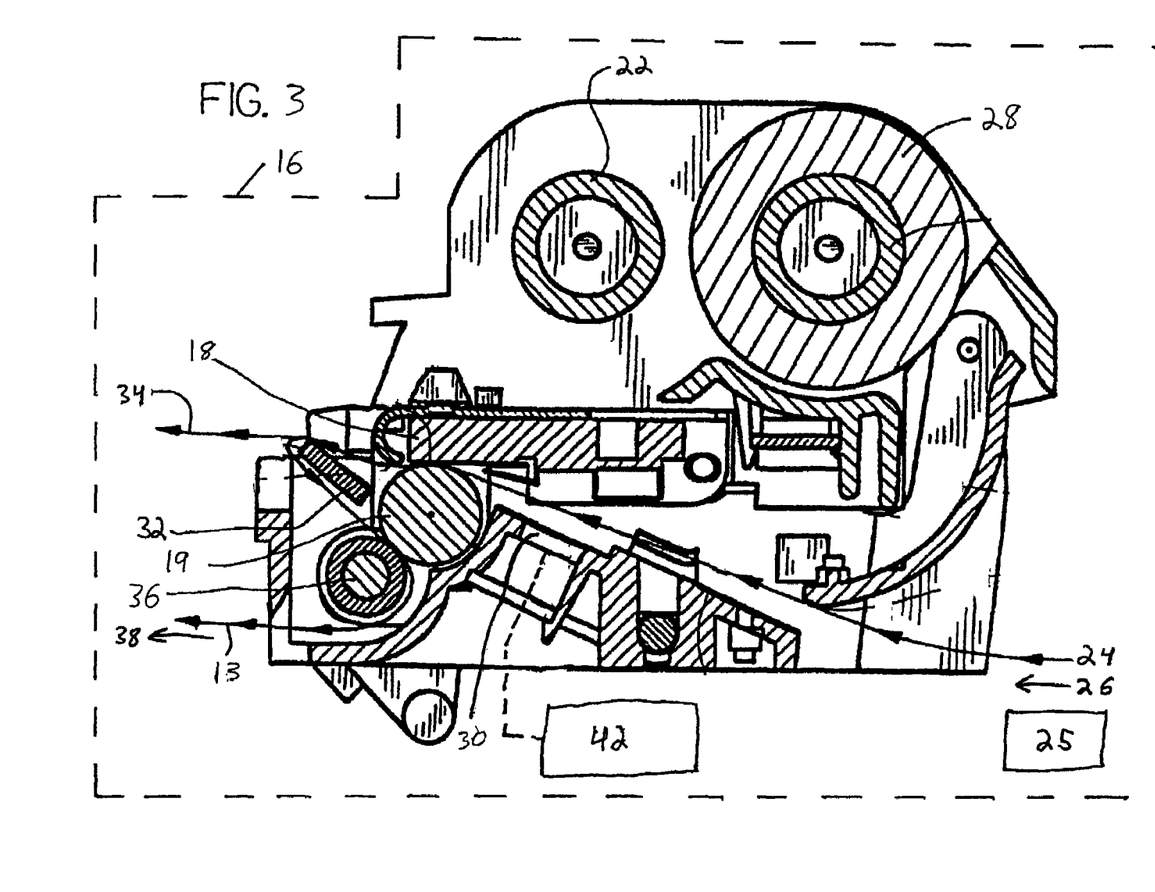
FIG. 3 is a side schematic view of a media printer according to one embodiment of the invention having an improved RFID interrogation system.

FIG. 3 illustrates by way of example only an implementation of the invention in a thermal transfer media printer 16 in which both printing and transponder communication are accomplished, but at different locations in the media printer 16. The media printer 16 includes a printhead sub-assembly comprising a conventional thermal printhead 18 and platen roller 19, as in a direct thermal printer for printing on thermally-sensitive media. A web 24 of media 11, such as labels, tickets, tags or cards, is directed along a feed path 26 under the printhead 18 where on-demand printing of text, bar codes and/or graphics takes place under control of a computer or microprocessor (not shown). After being printed, the media 11 follows a media exit path 34 and may be peeled off the underlying carrier substrate 13 at a peeler bar 32. The liner or carrier substrate 13 for the media is guided out of the media printer 16 by a roller 36 where it exits the printer along a carrier exit path 38.

When a thermal printer is configured for use as a thermal transfer printer, a ribbon supply roll 28 delivers a thermal transfer ribbon (not shown for clarity) between printhead 14 and the media on web 24. After use, the spent ribbon is collected on a take-up reel 22.

In accordance with an aspect of the present invention, the media printer 16 includes a transceiver 42 for generating RF communication signals that are fed to a frequency and spatially selective microstrip near field coupler 30 located proximate the media feed path 26. As will be explained and illustrated in detail hereinafter, the system (including transceiver 42 and near field coupler 30) forms a near field pattern in the location of a transponder operating region C (see FIG. 5A). The system is configured to establish at predetermined transceiver power levels a mutual coupling which exclusively activates and communicates with a single transponder 1 located in the transponder operating region C.

As labels or other media 11 with embedded transponders 1 move along the media feed path 26 through transponder operating region "C", data may be read from and or written to each transponder 1. Information indicia then may be printed upon an external surface of the media 11 as the media passes between the platen roller 19 and the printhead 18 by selective excitation of the heating elements in the printhead 18, as is well known in the art. When the media printer 16 is configured as a direct thermal printer, the heating elements form image dots by thermochromic color change in the heat sensitive media; when the media printer 16 is configured as a thermal transfer printer, then ink dots are formed by melting ink from the thermal transfer ribbon (not shown for clarity) delivered between printhead 18 and the media on web 24 from ribbon supply roll 28. Patterns of printed dots thus form the desired information indicia on the media 11, such as text, bar codes or graphics.

Media conveyance is well known in the art. Therefore the media conveyance 25 portion of the printer that drives the media with transponders along the media feed path 26 is not described in detail.

The near field coupler 30 according to the invention and its manner of operation will now be described with reference to FIGS. 4a-5b. One embodiment of the near field coupler 30 is configured for use, for example, with UHF RFID transponders. The RFID transponders 1 may be bulk supplied on a carrier substrate 13 attached to or embedded within label, ticket, card or tag media 11.

Figure 4A:
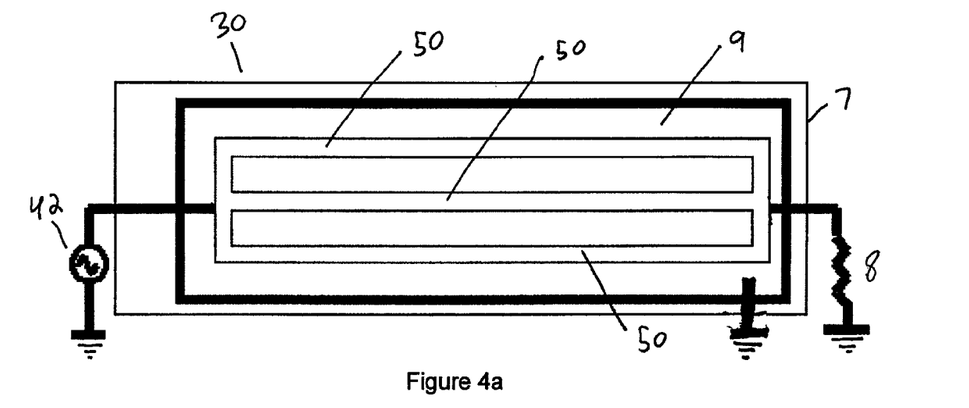
FIG. 4a is a top view of a coupler according to one embodiment of the invention.
Figure 4B:
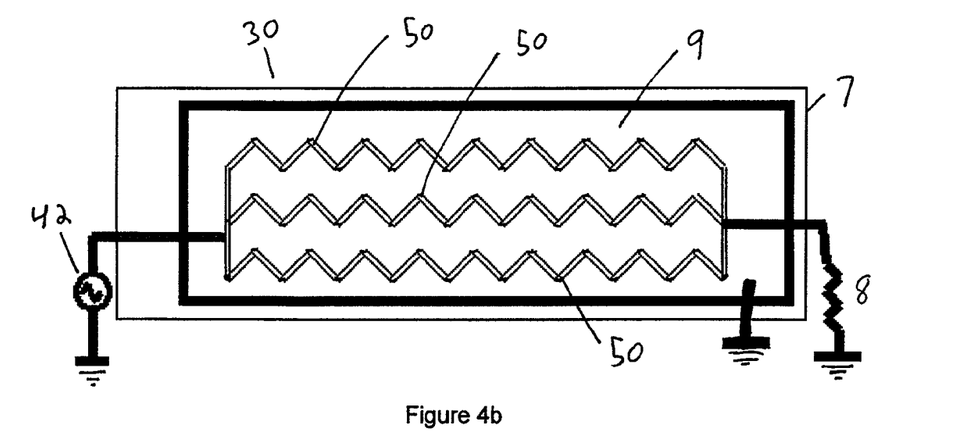
FIG. 4b is a top view of a coupler according to another embodiment of the invention.

The near field coupler 30 comprises an array of lines 50, as shown in FIGS. 4a and 4b. The near field coupler 30 is configured as a segment of unmatched line 50 upon a dielectric substrate, for example a printed circuit board 7, having a ground plane 9 formed on a spaced apart isolated layer, for example the reverse side of the printed circuit board 7. One end of the array of lines 50 is connected to the transceiver 42; the other end is connected to the ground plane 9 by means of terminating resistor 8.

Figure 5A:
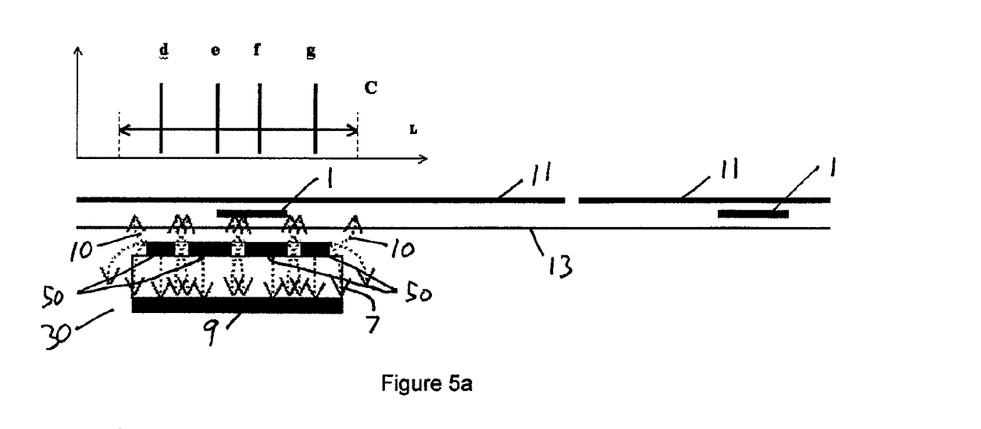
FIG. 5a is a simplified cut-away side view of a transponder-coupler structure using a coupler according to the invention, illustrating schematically the spaced apart areas where coupling with a narrow dimensioned transponder supplied in-line with other transponders on a carrier substrate may occur.

Rather than operating as a standing wave radiating antenna, or magnetic field generating coil, the near field coupler 30 according to the invention operates as a one half wavelength unmatched transmission line with, for example, a 15 ohm characteristic impedance that is terminated by a R=50 ohm terminating resistor 8. Signals generated by the transceiver 42 passing along the transmission line generate a near field effect emanating from the transmission line edges that couples with a transponder 1 passing through the transponder operating region. Another description for the near field effect is "leaky", as discussed in "Leaky Fields on Microstrip" L. O. McMillian et al. Progress in Electromagnetics Research, PIER 17, 323-337, 1997 and hereby incorporated by reference in the entirety. Because the near field effect is extremely local to the transmission line and degrades at an exponential rate with increasing distance from the transmission line, the resulting transponder operating region of a single transmission line is very narrow. According to the invention, the prior rectangular conductive strip is therefore replaced with an array formed by a plurality of commonly fed and terminated, i.e. electrically parallel, line(s) 50, as shown for example in FIGS. 4a and 4b. The plurality of line(s) 50 therefore creates an array of leaky edges as shown in FIG. 5a; each leaky edge creating an electromagnetic power leakage 10 at several points within transponder operating region C. The resulting line array has similar overall width to the prior solid microstrip coupler 3 and may be similarly tuned, by adjusting the length, spacing and dielectric properties between the line(s) 50 and the ground plane 9 as well as the number of line(s) 50 and or individual line widths, shapes and inter-spacing, to adjust the overall array as an integrated single electrical structure to have the desired frequency response characteristics and generate a combined near field effect corresponding to a desired transponder operating region.

Figure 5B:
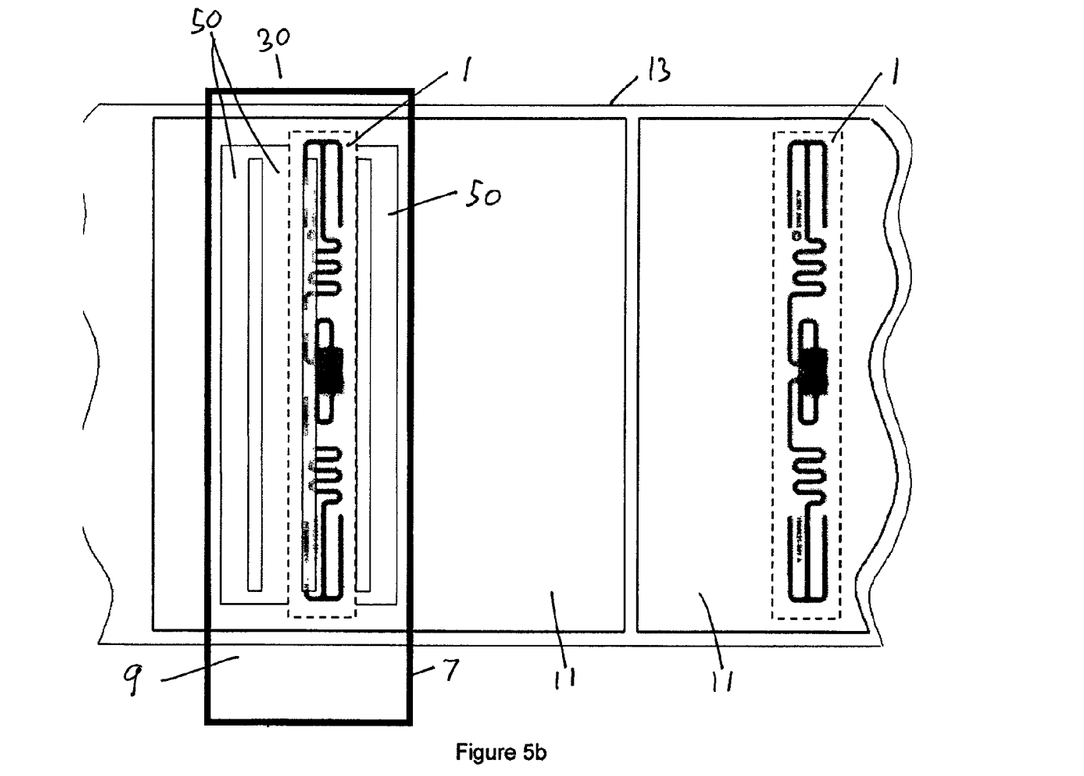

As shown by FIGS. 5a and 5b, the transponder operating region C resulting from a near field coupler 30 according to the invention is substantially uniform. Depending upon spacing between the lines and applies power levels, narrow null gaps in the operational region C may occur, as illustrated by d, e, f, and g in FIG. 5a. Simplified logic added to the media transport system may be used to move the media 11 forward a small increment, for example 1-2 millimeters if a transponder 1 in the transponder operating region C falls upon one of these null gaps and transponder communications is lost. These narrow null gaps are evidence of the extremely local field concentrations produced by the near field effect and the precision with which the transponder operating region may be configured to have a wide area with sharply defined boundaries. These characteristics make the near field coupler 30 useful for eliminating precision transponder placement requirements for media suppliers, complex transponder location and tracking logic in media supply systems, as well as any requirements for shielding or increased transponder placement tolerance requirements. Further, the increased transponder operating region C provided by the present invention allows users increased freedom to place embedded transponder(s) 1 in media 11 at desired locations, for example to avoid the printing degradation that may occur when the printhead encounters a media surface irregularity due to the presence of a RFID transponder 1.

The array of lines 50 of the near field coupler 30 may be formed by a plurality of straight line(s) 50 as shown in FIG. 4a. To further tune the near field produced by the line(s) 50, a zig-zag or wiggle may be applied to each line 50, as shown for example in FIG. 4b to reduce the appearance and/or depth of the field strength gaps d, e, f and g. For the purpose of this specification, "zig-zag" is defined as a characteristic of a line having an overall length characteristic, but a plurality of direction changes internal to the overall length of the line. The direction changes may, for example, be sharply defined or occur as smooth curves.

Alternatively, a simplified transponder 1 read and or write system may be formed without printing capabilities by positioning a near field coupler 30 coupled to a transceiver 42 proximate a media conveyance 25 moving sequential transponders 1 through a transponder operating region C. This structure is also useful where the media 11 is unprinted, or printed upon at another location.

The near field coupler 30 is not limited to a dual plane structure. For example, the near field coupler 30 may be co-planar, i.e. the ground plane and the array of lines 50 may be located, electrically isolated from each other, in the same plane of a printed circuit board but on different traces. Also, the lines 50 need not be co-planar, but may form a 3-dimensional structure. For example, the lines 50 may be on multiple layers of a printed circuit board or formed as a wire frame of lines 50 without use of printed circuit board technology.

Obviously, at some exaggerated transceiver power level, certain transponders 1 outside the transponder operating region C may be excited. However, by this invention, at appropriate power levels in the range of normal transponder read and write power levels the mutual coupling created will be highly selective for the transponder 1 in the transponder operating region C. By mapping and then applying only the required power levels for a range of both different transponder 1 types and positions within the transponder operating region C, energy consumption and potential RF interference generation may be minimized.

The spatially-selective near field property and the lack of any other shielding requirements of the near field coupler 30 according to the invention allows the economical addition of a compact, spatially-selective transponder communication module in devices such as printer-encoders.

Because the near field coupler 30 may be configured to be selective exclusively for a single transponder located in the transponder operating region C, it is now possible by this invention to use a web 24 of media having transponders which are closely spaced on the web 24, as shown for example in the figures of this specification. Prior to this invention it was extremely difficult to communicate with just one electro-magnetically-coupled UHF transponder, which may have a wide number of different physical configurations, in a closely spaced series of transponders without simultaneously activating adjacent transponders.

Where in the foregoing description reference has been made to ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail.

Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of the applicant's general inventive concept. Further, it is to be appreciated that improvements and/or modifications may be made thereto without departing from the scope or spirit of the present invention as defined by the following claims.

That which is claimed:

1. A printer including a transceiver adapted to communicate with transponders, comprising:
 a printhead;
 a media conveyance adapted to transport a series of discrete media to said printhead and through a transponder operating region, at least some of said media including a transponder;
 a near field coupler configured to generate a near field effect to couple with the transponder for data transfer; the near field coupler having a plurality of lines electrically interconnected in parallel, and a spaced away ground plane.

2. The printer defined by claim 1 wherein the near field coupler is formed as traces on a printed circuit board.

3. The printer defined by claim 1 wherein the near field coupler has a characteristic impedance and the near field coupler is terminated by a terminating resistor having a different characteristic impedance.

4. The printer defined by claim 1 wherein the plurality of lines are arranged parallel to each other.

5. The printer defined by claim 1 wherein at least one of the plurality of lines has a zig-zag configuration.

6. The printer defined by claim 1 wherein said printhead is positioned and configured to print on or adjacent said transponder while it is still in said transponder operating region.

7. The printer defined by claim 1 wherein said printhead is positioned and configured to print on or adjacent said transponder when it is outside of said transponder operating region.

8. The printer defined by claim 1 adapted to feed a web of spaced transponders through said transponder operating region, and wherein said printer communicates with a transponder located in said transponder operating region but concurrently not with another transponder located outside of said transponder operating region.

* * * * *